(12) United States Patent
DeBoer et al.

(10) Patent No.: US 7,386,424 B2
(45) Date of Patent: Jun. 10, 2008

(54) ASTRONOMICAL CALCULATIONS IN LIGHTING CONTROL PANEL WITH PRE-POPULATED CITIES

(75) Inventors: John DeBoer, Decatur, GA (US); Seshagiri R Marellapudi, Norcross, GA (US); Ravikumar Balasubramaniam, Alpharetta, GA (US); David M Williams, Alpharetta, GA (US)

(73) Assignee: Siemens Energy & Automation, Inc., Alpharetta, GA (US)

( * ) Notice: Subject to any disclaimer, the term of this patent is extended or adjusted under 35 U.S.C. 154(b) by 0 days.

(21) Appl. No.: 11/635,232

(22) Filed: Dec. 7, 2006

(65) Prior Publication Data

US 2008/0077360 A1 Mar. 27, 2008

Related U.S. Application Data

(60) Provisional application No. 60/826,584, filed on Sep. 22, 2006.

(51) Int. Cl.
*G06F 11/00* (2006.01)
(52) U.S. Cl. .................................. 702/188; 702/182
(58) Field of Classification Search ............... 702/182, 702/188; 700/22, 31, 19, 286–298; 307/29, 307/37, 38; 705/412, 63; 315/312, 159; 340/825.36
See application file for complete search history.

(56) References Cited

U.S. PATENT DOCUMENTS 4,362,970 A * 12/1982 Grady ..................... 315/159
5,936,362 A * 8/1999 Alt et al. .................. 315/312
6,940,735 B2 * 9/2005 Deng et al. ................ 363/37
6,965,801 B2 * 11/2005 Hall .......................... 700/66

OTHER PUBLICATIONS

Bupasiri et al., 'Optimal Electric Power Distribution System Reliability Indices Using Binary Programming', 2003, IEEE Publication, pp. 556-561.*

* cited by examiner

*Primary Examiner*—Edward Raymond
*Assistant Examiner*—Elias Desta

(57) ABSTRACT

An electrical distribution system for selectively connecting an electrical power source to a load device uses astronomical calculations. The system comprises a switching device electrically connected between an electrical power source and a load device for selectively delivering electrical power to the load device. A control system controls operation of the switching device. The control system comprises a programmed controller for commanding operation of the switching device in accordance with a scheduling routine stored in a memory. The scheduling routine enables control of the switching device based on sunrise and sunset time. The memory further comprises a database of a plurality of geographic locations and coordinate information for the plurality of geographic locations. The control system further comprises a setup routine comprising a user interface enabling a user to select one of the plurality of geographic locations and a manager routine automatically determining sunrise and sunset times using the coordinate information for the selected geographic location and providing the sunrise and sunset times to the scheduling routine.

20 Claims, 7 Drawing Sheets

Fig. 7

| Initialization | -Location |
|---|---|

Select the closest city near to you (or) specify your co-ordinates

Select Country: ~700
[USA ▽]

Select City: ~702
[Atlanta ▽]

Today: 5/3/2006 12:30PM
Sunrise: 5:42AM
Sunset: 6:17PM
Longitude: 84.1345 N  ~704
Latitude: 139.2346 E ☐ Observe Daylight Savings

| Initialization | -Location |
|---|---|

◉ Degree  ○ Decimal   Time Zone (+/-GMT) [+5 ▽] Hours

Latitude:                    Longitude:
[33][58][27][N ▽]      [84][14][6][W ▽]

[1][2][3][4]
[5][6][7][8]
[9][10][.][CLR]

| Initialization | -Location |
|---|---|

○ Degree  ◉ Decimal   Time Zone (+/-GMT) [+5 ▽] Hours

Latitude:                    Longitude:
[33.9742][N ▽]          [84.2350][W ▽]

[1][2][3][4]
[5][6][7][8]
[9][10][.][CLR]

💾 ✕

ASTRONOMICAL CALCULATIONS IN LIGHTING CONTROL PANEL WITH PRE-POPULATED CITIES

CROSS REFERENCE TO RELATED APPLICATIONS

This application claims priority of provisional application No. 60/826,584 filed Sep. 22, 2006, the contents of which is incorporated by reference herein.

FIELD OF THE INVENTION

This invention relates generally to residential and commercial electrical power distribution panels and components, and more particularly, to a system and method for connecting an electrical power source to a load device using astronomical calculations.

BACKGROUND OF THE INVENTION

Circuit breaker panels are used to protect electrical circuitry from damage due to an overcurrent condition, such as an overload, a relatively high level short circuit, or a ground fault condition. To perform that function, circuit breaker panels include circuit breakers that typically contain a switch unit and a trip unit. The switch unit is coupled to the electrical circuitry (i.e., lines and loads) such that it can open or close the electrical path of the electrical circuitry. The switch unit includes a pair of separable contacts per phase, a pivoting contact arm per phase, an operating mechanism, and an operating handle.

In the overcurrent condition, all the pairs of separable contacts are disengaged or tripped, opening the electrical circuitry. When the overcurrent condition is no longer present, the circuit breaker can be reset such that all the pairs of separable contacts are engaged, closing the electrical circuitry.

In addition to manual overcurrent protection via the operating handle, automatic overcurrent protection is also provided via the trip unit. The trip unit, coupled to the switch unit, senses the electrical circuitry for the overcurrent condition and automatically trips the circuit breaker. When the overcurrent condition is sensed, a tripping mechanism included in the trip unit actuates the operating mechanism, thereby disengaging the first contact from the second contact for each phase. Typically, the operating handle is coupled to the operating mechanism such that when the tripping mechanism actuates the operating mechanism to separate the contacts, the operating handle also moves to a tripped position.

Switchgear and switchboard are general terms used to refer to electrical equipment including metal enclosures that house switching and interrupting devices such as fuses, circuit breakers and relays, along with associated control, instrumentation and metering devices. The enclosures also typically include devices such as bus bars, inner connections and supporting structures (referred to generally herein as "panels") used for the distribution of electrical power. Such electrical equipment can be maintained in a building such as a factory or commercial establishment, or it can be maintained outside of such facilities and exposed to environmental weather conditions. Typically, hinge doors or covers are provided on the front of the switchgear or switchboard sections for access to the devices contained therein.

In addition to electrical distribution and the protection of circuitry from overcurrent conditions, components have been added to panels for the control of electrical power to loads connected to circuit breakers. For example, components have been used to control electrical power for lighting.

One system used for controlling electrical power to loads utilizes a remote-operated circuit breaker system. In such a system, the switch unit of the circuit breaker operates not only in response to an overcurrent condition, but also in response to a signal received from a control unit separate from the circuit breaker. The circuit breaker is specially constructed for use as a remote-operated circuit breaker, and contains a motor for actuating the switch unit.

In an exemplary remote-operated circuit breaker system, a control unit is installed on the panel and is hard-wired to the remote-operated circuit breaker through a control bus. When the switch unit of the circuit breaker is to be closed or opened, an operating current is applied to or removed from the circuit breaker motor directly by the control panel. Additional, separate conductors are provided in the bus for feedback information such as contact confirmation, etc., for each circuit breaker position in the panel. The control unit contains electronics for separately applying and removing the operating current to the circuit breakers installed in particular circuit breaker positions in the panel. The panel control unit also has electronics for checking the state of the circuit breaker, diagnostics, etc.

Lighting control systems may include a schedule program to automatically turn a light or lights on and off at select times of day according to user requirements. This can be based on occupancy trends, or the like. However, some lighting, such as exterior lighting, is advantageously turned on or off based on daylight conditions. For example, it might be desirable to turn a light on at sunset and off at sunrise. This may be accomplished by using an ambient light sensor. However, use of such sensors can be expensive to install and maintain. Alternatively, control systems can calculate sunrise and sunset time based on coordinate information such as longitude and latitude. However, this requires that the user have access to such information which is not always generally available.

The present invention is directed to improvements in electrical distribution systems using astronomical calculations with pre-populated cities.

SUMMARY OF THE INVENTION

In accordance with the invention, there is provided an electrical distribution system performing astronomical calculations with a database of pre-populated cities.

There is disclosed in accordance with one aspect of the invention an electrical distribution system for selectively connecting an electrical power source to a load device using astronomical calculations. The system comprises a switching device electrically connected between an electrical power source and a load device for selectively delivering electrical power to the load device. A control system controls operation of the switching device. The control system comprises a programmed controller for commanding operation of the switching device in accordance with a scheduling routine stored in a memory. The scheduling routine enables control of the switching device based on sunrise and sunset time. The memory further comprises a database of a plurality of geographic locations and coordinate information for the plurality of geographic locations. The control system further comprises a setup routine comprising a user interface enabling a user to select one of the plurality of geographic locations and a manager routine automatically determining sunrise and sunset times using the coordinate information for the selected geographic location and providing the sunrise and sunset times to the scheduling routine.

It is a feature of the invention that the manager routine may be operated daily to determine sunrise and sunset times using the coordinate information for the selected geographic location and provide the sunrise and sunset times to the scheduling program.

It is another feature of the invention that the control system further comprises a touch screen display used by the user interface to select one of the plurality of geographic locations.

It is an additional feature of the invention that the geographic locations comprise pre-select cities.

It is a further feature of the invention that the setup routine may include a manual override enabling a user to manually enter coordinate information.

It is still another feature of the invention that the coordinate information comprises longitude, latitude and time zone of the geographic locations.

It is still a further feature of the invention to provide a panelboard and a plurality of switching devices mounted in the panelboard and wherein the control system controls operation of the plurality of switching devices in accordance with the scheduling routine.

The panelboard may support a plurality of circuit breakers, each electrically connected in series with one of the plurality of switching devices. The switching devices may be removable from the panel board separately from the control system.

It is still another feature of the invention that the switching device comprises a control relay.

There is disclosed in accordance with another aspect of the invention a lighting control system for selectively connecting an electrical power source to load devices using astronomical calculations. The system comprises a plurality of pairs of circuit breakers and switching devices each pair electrically connected between an electrical power source and a load device for selectively delivering electrical power to load devices. A control system controls operation of the switching devices. The control system comprises a programmed controller for commanding operation of the individual switching devices in accordance with a scheduling routine stored in a memory. The scheduling routine enables control of the switching devices based on sunrise and sunset time. The memory further comprises a database of a plurality of geographic locations and coordinate information for the plurality of geographic locations. The control system further comprises a setup routine comprising a user interface enabling a user to select one of the plurality of geographic locations and a manager routine automatically determining sunrise and sunset times using the coordinate information for the selected geographic location and provide any sunrise and sunset times to the scheduling program.

There is disclosed in accordance with a further aspect of the invention the method for selectively connecting an electrical power source to a load device using astronomical calculations, comprising: providing a switching device electrically connected between an electrical power source and a load device for selectively delivering electrical power to the load device; providing a programmed controller for commanding operation of the switching device in accordance with a scheduling routine stored in a memory, the scheduling routine enabling control of the switching device based on sunrise and sunset time, the programmed controller including a database of a plurality of geographic locations and coordinate information for the plurality of geographic locations; operating a user interface of the programmed controller to select one of the plurality of geographic locations; and automatically determining sunrise and sunset times using the coordinate information for the selected geographic location and providing the sunrise and sunset times to the scheduling routine.

Further features and advantages of the invention will be readily apparent from the specification and from the drawings.

BRIEF DESCRIPTION OF THE DRAWINGS

FIGS. 7-9 comprises a series of user interface screens used in connection with the initialization routine of FIG. 6;

DETAILED DESCRIPTION OF THE INVENTION

An electrical distribution system, such as an integrated lighting control system, in accordance with the invention permits a user to control power circuits typically used for lighting, as well as circuits for resistive heating or air conditioning, using astronomical calculations. Control may include on/off switching, dimming and metering. The electrical distribution system may be as is generally described in U.S. application Ser. No. 11/519,727, filed Sep. 12, 2006, the specification of which is incorporated by reference herein.

Figure 1:
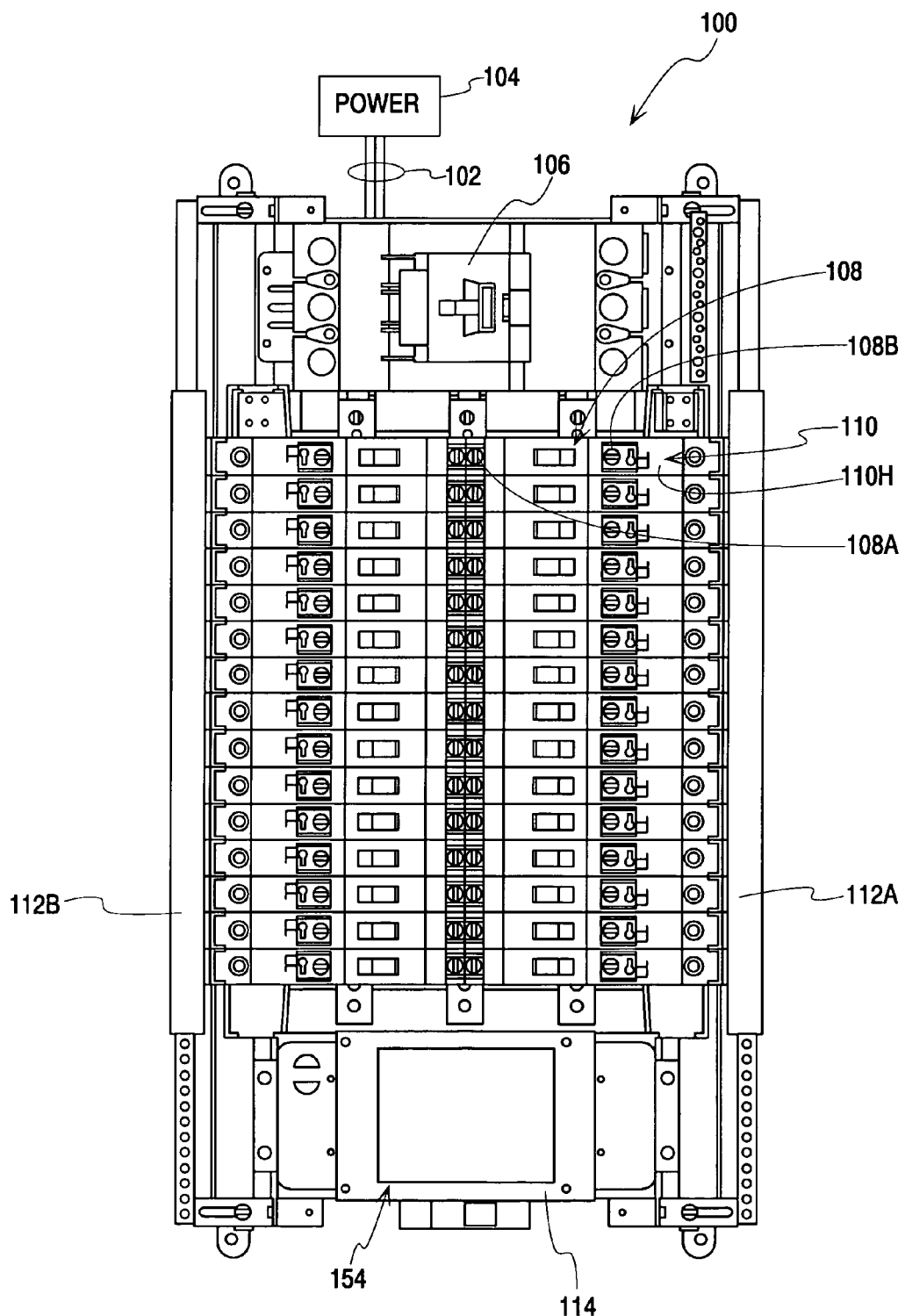
FIG. 1 is an elevation view of a power distribution panel according to the invention.

Referring to FIG. 1, a lighting control system in accordance with the invention comprises a lighting control panel 100. The panel 100 may comprise a Siemens type P1 panelboard, although the invention is not limited to such a configuration. Line power enters the panel 100 through power source cables 102 connected to a source of power 104. Line power may, for example, be a three phase 480Y277, 240 or 120 VAC power source, as is conventional. The cables 102 are electrically connected to an input side of a main breaker 106. The main breaker 106 distributes line power to individual circuit breakers 108 in a conventional manner. How the power is distributed depends on design of the individual circuit breakers 108, as will be apparent to those skilled in the art. The power is distributed to the line side of individual circuit breakers 108. The panel 100 may be configured to accept up to forty two individual circuit breakers 108, although only thirty are shown in the embodiment of FIG. 1. Each circuit breaker may be of conventional construction and may be, for example, a Siemens BQD circuit breaker. Each circuit breaker 108 includes a line lug or terminal 108A receiving power from the main breaker 106 and a load lug or terminal 108B conventionally used for connecting to a load circuit.

For simplicity of description, when a device such as a circuit breaker 108 is described generally herein the device is referenced without any hyphenated suffix. Conversely, if a specific one of the devices is described it is referenced with a hyphenated suffix, such as 108-1.

In accordance with the invention, each load circuit to be controlled also has a remote operated device 110, such as a relay, a meter or a dimmer. The term remote operated device as used herein includes any other devices that controls, monitors or may otherwise be used in a load circuit, in accordance with the invention. While in a preferred embodiment, the remote operated device 110 is a separate component from the circuit breaker 108, the term "remote operated device" as used herein encompasses devices integral with the circuit breaker. The remote operated devices 110 are also connected to data rails 112A and 112B. A panel controller 114 controls the remote operated devices 110 through connections provided via the data rails 112A and 112B, as discussed below.

The remote operated device 110 includes a housing 110H encasing an auxiliary set of contacts that can be remotely operated to open and close a lighting circuit. The device 110 is attached to the load side of a circuit breaker 108 within a panel 100 using a conductor tab, i.e, the terminal 110A, inserted into the breaker lug 108B. The load terminal 110B comprises a lug of the same size as the breaker lug 108B for connecting to a wire to be connected to the load device. The device housing 110H is configured to mount in a Siemens type P1 panelboard, although the invention is not limited to such a configuration.

Figure 2:
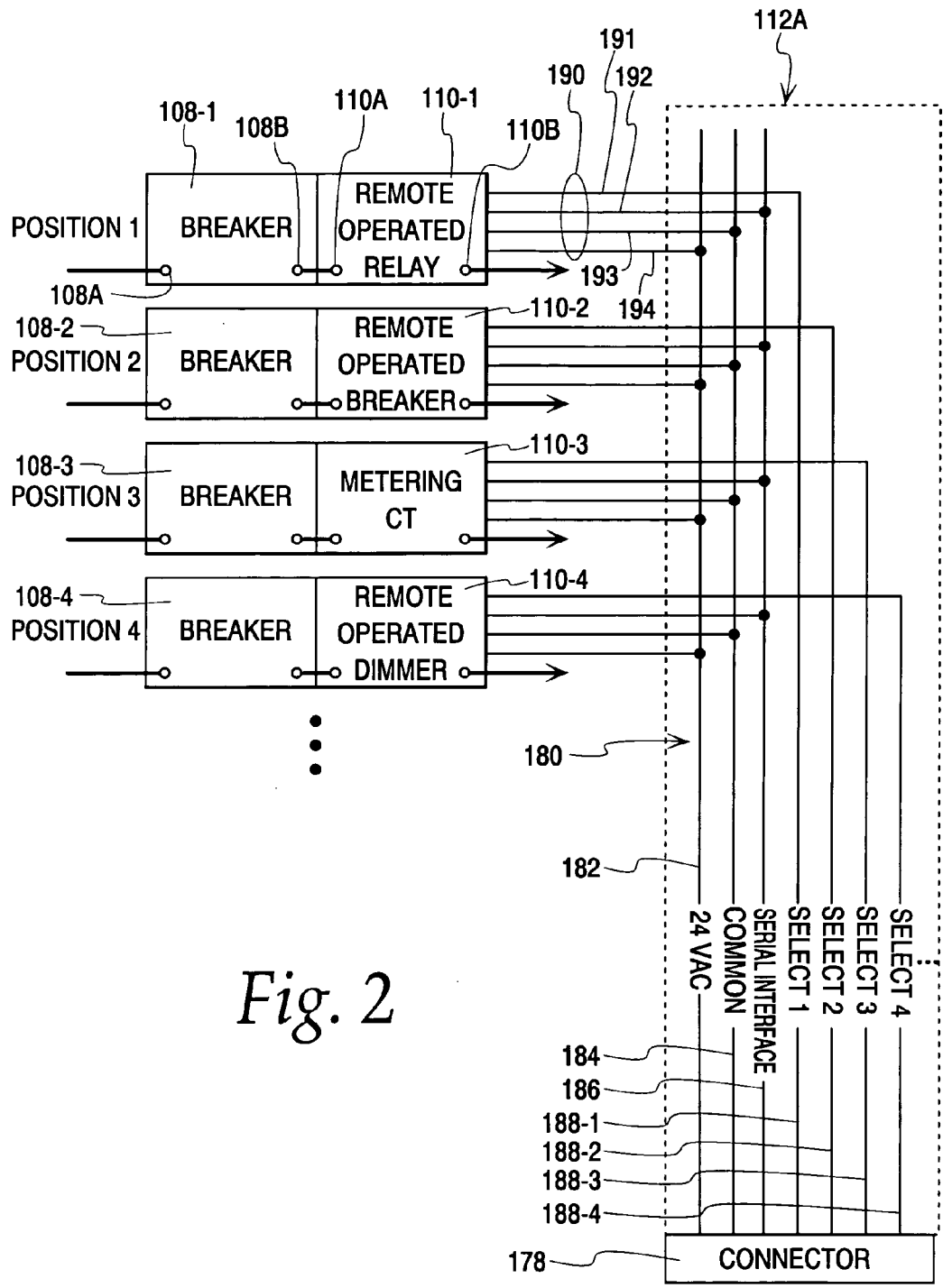
FIG. 2 is a block diagram illustrating pairs of circuit breakers and remote operated devices of the power distribution panel of FIG. 1.

Referring to FIG. 2, a block diagram illustrates four circuit breakers 108-1, 108-2, 108-3 and 108-4, and respective associated remote operated devices 110-1, 110-2, 110-3 and 110-4. In the illustrated embodiment, the first device 110-1 comprises a relay, the second device 110-2 comprises a breaker, the third device 110-3 comprises a current transformer, and the fourth device 110-4 comprises a dimmer. As is apparent, any combination of these remote operated devices 110 could be used. Each remote operated device 110 includes an input terminal 110A electrically connected to the associated circuit breaker load terminal 108B, and an output terminal 110B for connection to a load device.

Figure 3:
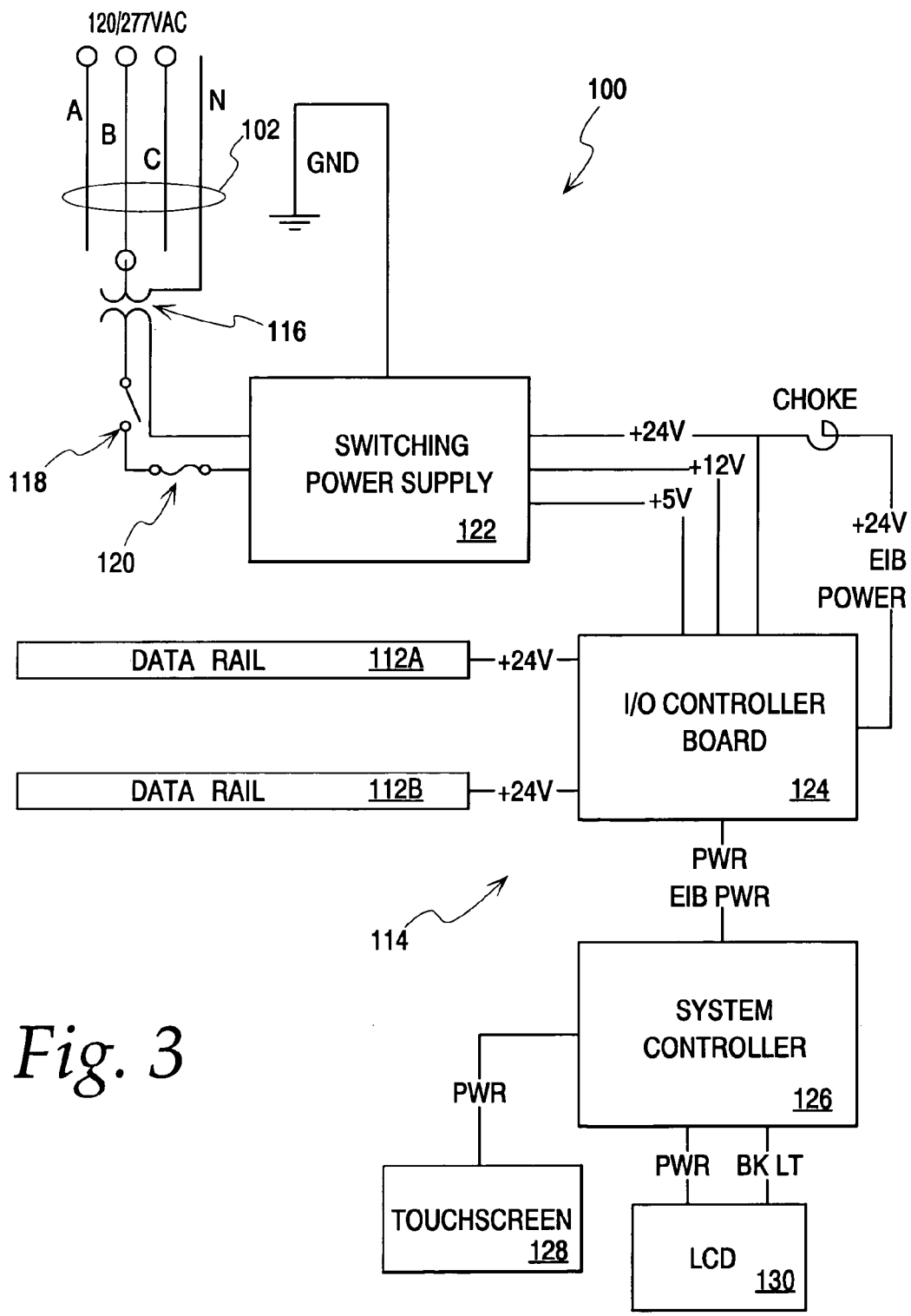
FIG. 3 is a block diagram of the power distribution panel of FIG. 1.

Referring to FIG. 3, a block diagram of the lighting control panel 100 is illustrated. Power from the lines 102 is provided via an isolation transformer 116, power switch 118 and fuse 120 to a switching power supply 122. The panel controller 114 comprises an input/output (I/O) controller 124 and optionally a system controller 126. While the I/O controller 124 and the system controller 126 are described as separate elements, the functionality can be combined into a single controller, as will be apparent. The power supply 122 provides isolated power to all of the control components including the I/O controller 124, the system controller 126, and the remote operated devices 110, see FIG. 1, via the data rails 112A and 112B. The I/O controller 124 and system controller 126 each have DC-DC converters deriving regulated DC voltage levels as required from the main DC output of the power supply 122. The power supply 122 also provides 24 volts to the remote operated devices 110. The system controller 126 is operatively connected to a touch screen 128 and an LCD 130.

Figure 4:
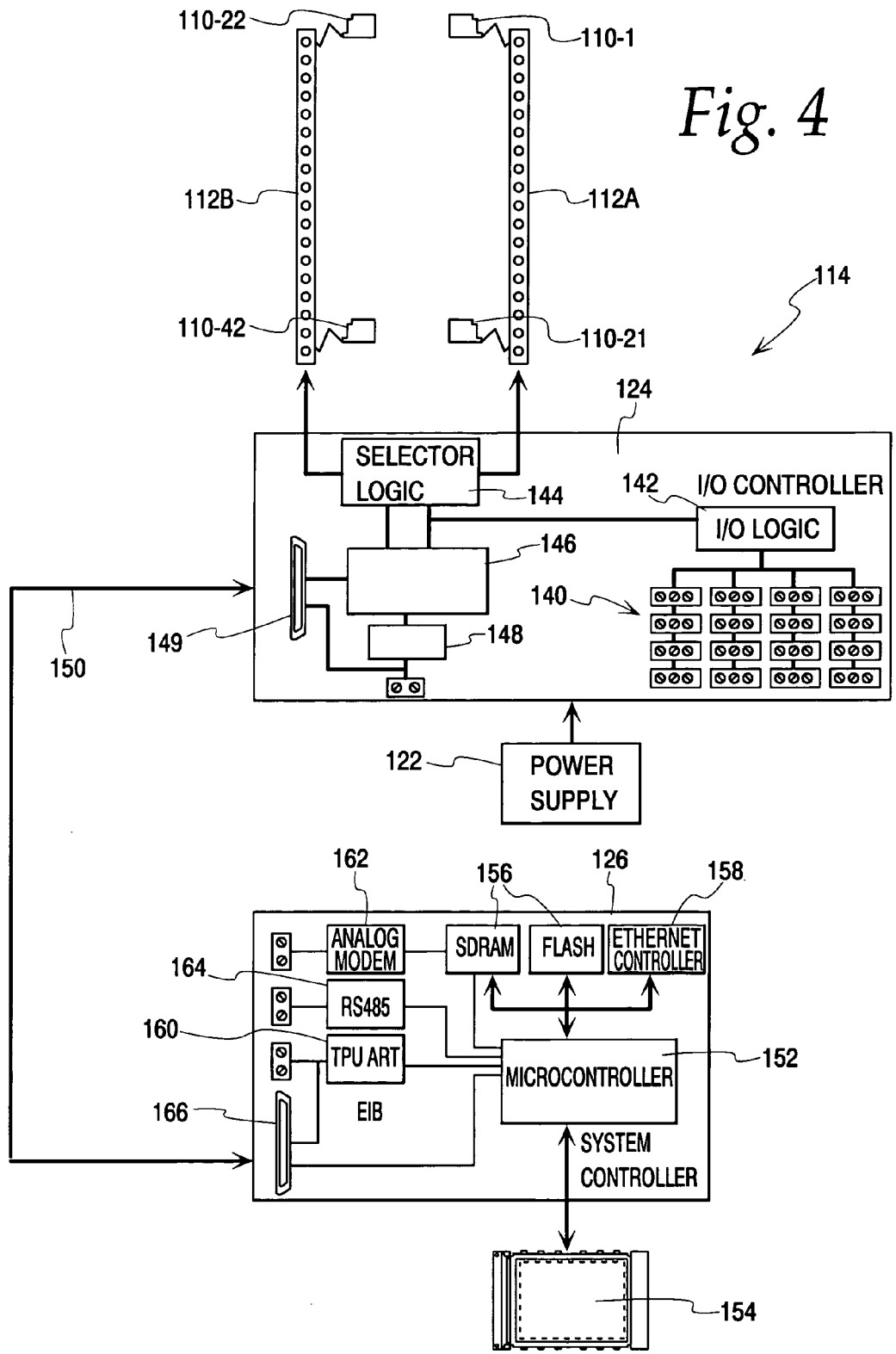
FIG. 4 is an expanded schematic/block diagram of the power distribution panel of FIG. 1.

In one embodiment of the invention, shown in FIG. 4, the panel controller 114 functions as a single panel stand alone system. The I/O controller 124 supplies power and control signals through the rails 112A and 112B to the remote operated devices, four of which, 110-1, 110-21, 110-22 and 110-42, are illustrated. A user interface and high level scheduling and control are provided by the system controller 126.

The I/O controller 124 provides discrete inputs to the controller 114 from dry contact switches, such as wall switches, (not shown) which can be connected to discrete input terminals 140. The terminals 140 are organized as two inputs and a common. The inputs to the terminals 140 are detected by dry contact I/O logic 142. A selector logic block 144 generates selector line signals and serial communications to the remote operated devices 110 via the data rails 112. The logic blocks 142 and 144 are operatively associated with a microprocessor or microcontroller 146. A TP-UART integrated circuit 148 provides an EIB (European Installation Bus) interface. A connector 149 allows mating directly to the system controller 126 via a cable 150.

The system controller 126 provides the user with an application to implement lighting schedules, organize devices into logical groups, manage the inputs, and obtain status information. The system controller 126 includes a microprocessor 152 operatively connected to a user interface 154 in the form of an integrated touch screen 128 and LCD 130, see FIG. 3. The microprocessor 152 is also connected to memory devices 156 and an ethernet controller 158. A TP-UART circuit 160 provides an EIB interface while additional interfaces are provided via an analog modem 162 and RS 485 interface circuit 164. A connector 162 is provided for connection to the cable 150 to transfer information between the system controller 126 and the I/O controller 124.

Referring again to FIG. 2, a data rail 112 is illustrated schematically. The data rail 112 is mechanically attached directly to the interior of the lighting control panel 100. The data rail 112 comprises a shielded communication bus including a ribbon connector 178 having twenty-five to twenty-nine wires to be routed to the I/O controller 124. The ribbon connector 178 typically has twenty-six wires, two for power connection, two for ground connection, one for the serial line and up to twenty-one select lines, one for each remote operated device 110. Each data rail 112 provides a barrier to isolate the class 1 load wires from the class 2 signal wires used to manage the devices 110. The data rails 112 will connect to each device 110 via a connector that extends out of the device 110. The wires are connected to lines in the form of traces on a printed circuit board 180. A power trace 182 provides 24 volt DC power to each remote operated device 110. A common trace 184 provides a ground to each remote operated device 110. A serial interface trace 186 provides serial communication to each of the remote operated devices 110. A plurality of select line traces, four of which 188-1, 188-2, 188-3 and 188-4 are illustrated, are provided, one for each remote operated device 110. Each remote operated device 110 includes a four wire cable 190 for connection to the data rail 112. The four wires comprise a select line 191 connected to one of the select traces 188, a serial interface line 192 connected to the serial interface trace 186, a neutral wire 193 connected to the common trace 184 and a power wire 194 connected to the power trace 182.

In accordance with the invention, a unique select line is assigned to each breaker 108/remote operated device 110 pair positioned within the lighting control panel 100. Select lines are used by the I/O controller 124 to select single remote operated devices 110 to communicate via the serial interface 186 at any given time. For example, when the first select line 188-1 is asserted, the first remote operated device 110-1 listens for messages on the serial interface line 186. Conversely, messages on the serial interface line 186 are ignored if the first select line 188-1 is not asserted. A response by any of the remote operated devices 110 to a serial command is therefore conditional on whether its particular select line is asserted. The term "asserted", as used herein, means one state of a signal designated to cause the remote operated device to listen for messages. In a preferred embodiment, the select line has "high" and "low" states, the high state being the asserted state.

The remote operated device 110, in the form of a relay, allows remote switching of an electrical branch load. The device 110 is designed to fit inside a standard electrical panel board with up to forty-two branch circuit breakers 108. The device 110 is an accessory to a branch circuit breaker 108 allowing repetitive switching of the load without effecting operation of the circuit breaker 108.

The remote operator device 110 requires a means to receive command signals to open or close and to report back successful operation or device status. Also required is a means to drive opening and closing of the switch mechanism contacts. In accordance with the invention, the remote operated device uses two magnetically held solenoids as an actuator device and one electronic circuit board similar to a single pole device. With this design, electronic control circuitry is located inside the switching device itself. Only one circuit is needed to operate both actuators. The use of two magnetically held solenoids or "mag latches" as switching actuators results in very low energy requirements, requires short duration pulses to change position (measured in milliseconds), provides accurate and repeatable timing and requires that the control must reverse voltage polarity.

Figure 5:
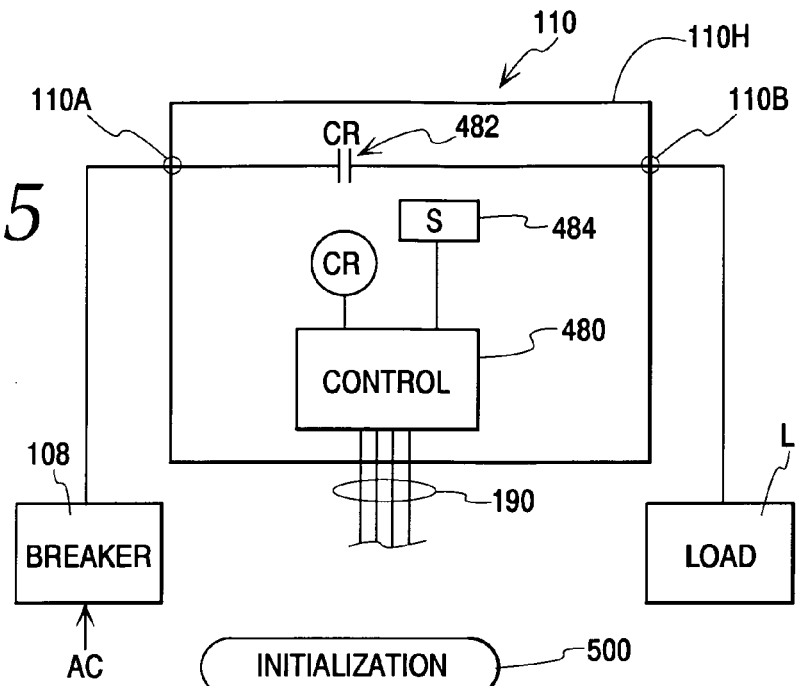
FIG. 5 is a block diagram of a remote operated device according to the invention.

FIG. 5 illustrates a basic block diagram for load switching. The remote operated device 110, in the form of a relay, includes a control circuit 480 connected to the cable 190. The control circuit 480 drives a control relay CR having a normally open contact 482 connected between the terminals 110A and 110B. A sensor 484 senses status of the relay CR and is connected to the control circuit 480. As such, the control circuit 480 controls operation of the contact 482 to selectively electrically connect a load L to the breaker 108, and thus to power the load L.

The control circuit 480 comprises a conventional microcontroller and associated memory, the memory storing software to run in the control circuit 480 in accordance with commands received from the I/O controller 124.

The software implemented in the remote operator device control circuit 480 includes various routines. This includes a start up routine executed when the control circuit 480 resets. It reads any data that has been stored in memory that needs to be modified during operations into ram variables. It turns out interrupts and otherwise initialize microcontroller operations and jumps into a status loop function.

The status loop function has several objectives. One is to keep the status data up to date to respond to status requests. Another is to run the state machine for the device, such as managing pulse widths and sequencing retry.

Pulse widths for open and close are not the same. Also, the pulse width for the open operation is not always the same, it increases by temperature/age/number of times closed. An open contacts function will set up the sequencer for an open operation placing a start open pulse task and a stop open pulse task into a sequence or queue. The open command is always executed, regardless of the detected position of the contacts, to overcome any failures in detecting the position of the contacts. A close contacts function sets up a sequencer for a close operation replacing a start close pulse task and a stop close pulse task into the sequencer queue. The close command will always be executed, regardless of the detected position, to overcome any failures in detecting the position of the contacts.

A communications handler function runs communications protocol over the serial line. The functions include decode command, open, close, send status and send report. A report operation function assembles the data required to respond to a report operation command received on the serial line.

Communications from the I/O controller 124 to the remote operated device 110 will be master-slave, with the I/O controller 124 being the master and the devices 110 the slaves. Once the I/O controller application sends an open or closed command, it will not wait for a response from the device 110. Rather, it hands over to the I/O sequencer queue, to perform a status check at a later time. This allows some time for the device 110 to settle down with its new status.

In the case of sending open or closed commands to more than one device 110 at the same time, one open command does the job after the I/O controller 124 enables the respective device select lines. For example, the I/O controller 124 might turn on the select line for devices 110-4, 110-7, 110-9, then send out one open command. Devices 110-4, 110-7 and 110-9 would all see the open command and attempt to open the mag latch.

In accordance with the invention, the system controller 126 provides a user interface application via the touch panel user interface 154 for the user to configure the system. This configuration includes setting up panels, breakers, zones, inputs, I/O mappings, schedules and overrides. As part of the set up process, schedules can be made based on sunrise and sunset times at any given location. The sunrise and sunset times are calculated based on the longitude, latitude and time zone of the location on a given day.

Schedules can be set up in the lighting control system 100 through the system controller 126 such that a remote operated device 110, or group of devices 110, can be turned on or off based on a sunrise or sunset time. Once a schedule is set up, then the sunrise and sunset times are automatically calculated for the location on a daily basis and the remote operated devices 110 are switched on or off based on how the schedule is set up.

Figure 6:
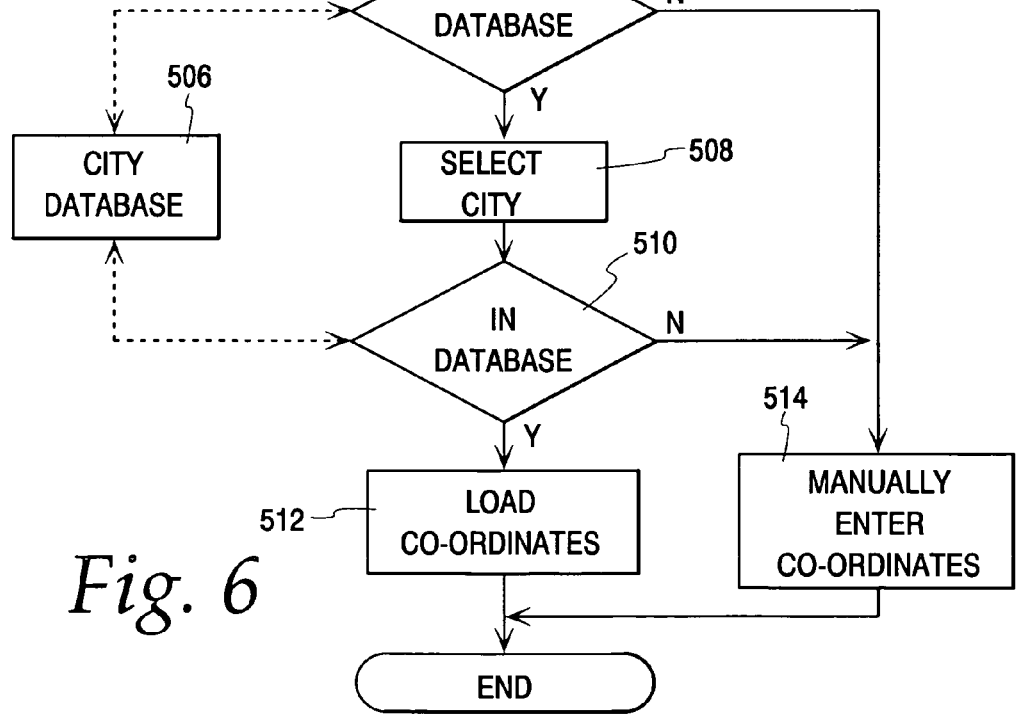
FIG. 6 is a flow diagram of an initialization routine implemented in the system controller of FIG. 4.

Referring to FIG. 6, a flow diagram illustrates an initialization routine 500 implemented in the system controller microcontroller 152, see FIG. 4. The initialization routine uses a database stored in the system controller memory 156. The database comprises a pre-populated list of cities and coordinate information for each city. The coordinate information comprises longitude, latitude and time zone for the location of the city. A user can choose the nearest city during the set up process. This eliminates requiring the user to find out the longitude and latitude and time zone for the particular location.

FIG. 7 illustrates a user interface screen displayed on the user interface 154, see FIG. 4, during the initialization routine 500. The routine begins at a block 502 where the user selects a country at a location 700 on the LCD screen. A decision block 504 determines if the country is in the database by accessing a database block 506. If so, then a city list is populated at a location 702 on the screen display. A user then selects from the list of cities at a block 508. A decision block 510 determines if the city is in the database. If so, then the coordinates for the city are loaded at a block 512 and displayed at screen display location 704, along with current time and date. This longitude and latitude and time zone are then used, as described below, to determine sunrise and sunset time which are displayed likewise as at 704.

If the country or city are not present in the database 506, then the user can choose "other" in the country or city and specify the exact longitude and latitude information of the location. This is done at the block 514 of FIG. 6. The user can manually specify the longitude and latitude information in degree format, as illustrated in FIG. 8, or decimal format, as illustrated in FIG. 9. Particularly, the user manually enters the latitude, longitude and time zone using a touch screen keypad.

Figure 10:
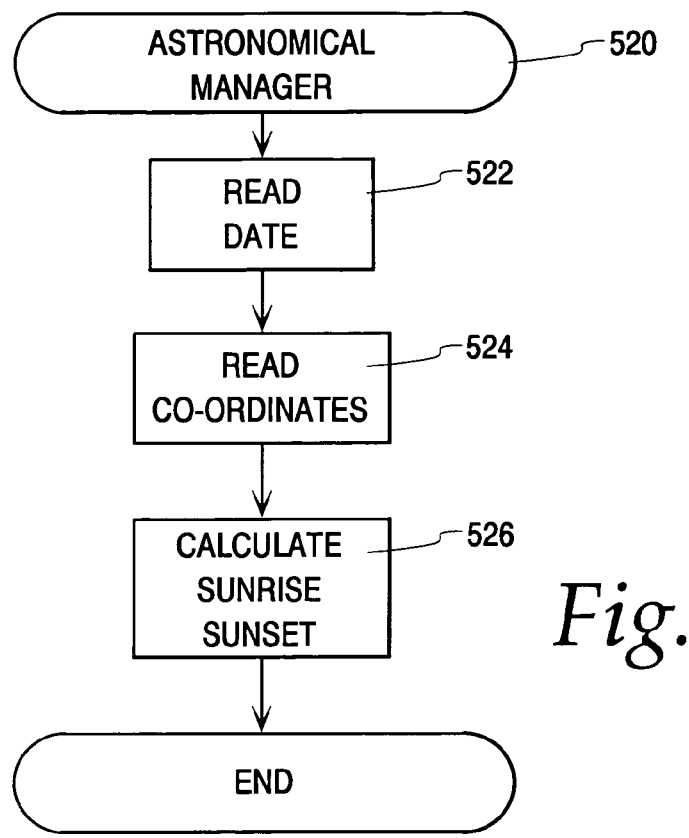
FIG. 10 is a flow diagram of an astronomical manager routine implemented in the system controller of FIG. 4.

FIG. 10 illustrates a flow diagram for an astronomical manager routine 520 implemented in the system controller 126 for calculating sunrise and sunset times. The routine begins at a block 522 which reads the current date. A block 524 reads the coordinates loaded during the initialization routine 500 at the block 512, see FIG. 6. A block 526 calculates the sunrise and sunset times. This calculation is performed daily. The sunrise and sunset times may be calculated using a conventional sunrise/sunset calculator and calculations may, for example, be based on equations from "Astronomical Algorithm" by Jean Meeus or as available from the National Oceanic & Atmospheric Administration Surface Radiation Research Branch.

The calculated sunrise and sunset times can then be delivered to the I/O controller 124 for use in implementing a scheduler routine 530.

Figure 11:
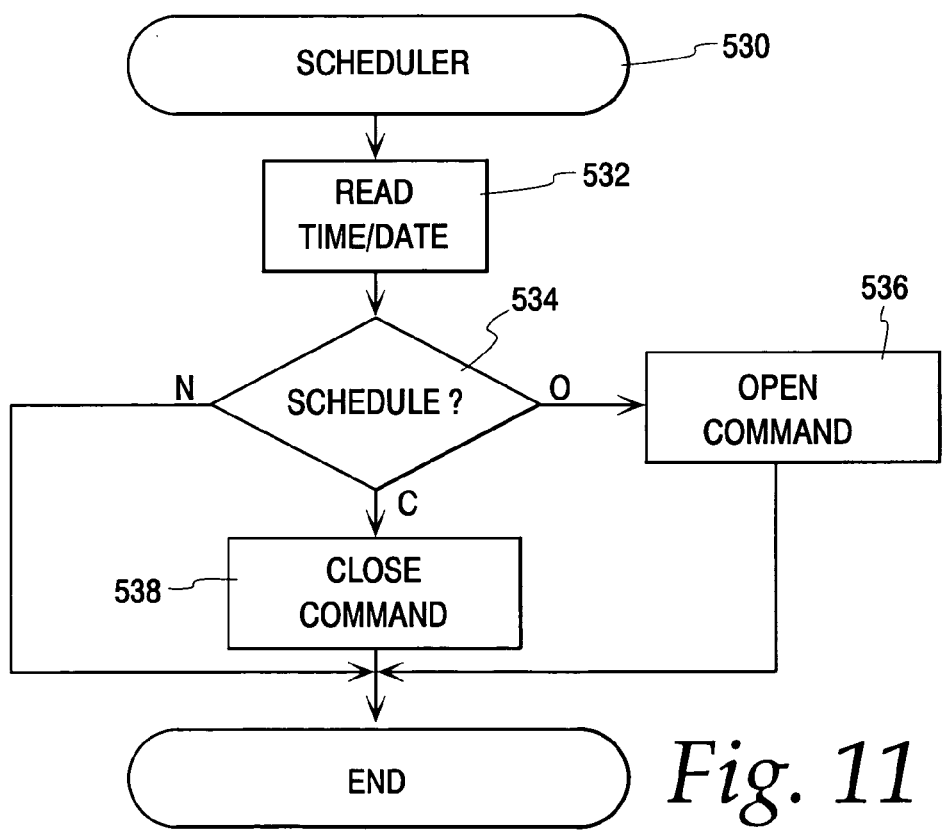
FIG. 11 is a flow diagram of a scheduler routine implemented in the I/O controller of FIG. 4.

FIG. 11 illustrates a flow diagram for the scheduler routine 530 in the I/O controller 124. The scheduler routine 530 begins at a block 532 which reads the current time and date based on a real time clock. A schedule block 534 determines if the time and date corresponds to an on or off time for any particular load device. For example, the schedule can be based on a specific preloaded time or based on sunrise or sunset time. If based on sunrise or sunset time, then the current day's sunrise and sunset time are read and used to make a determination. If it is necessary to issue an open command, then the open command is issued at a block 536. If a close command should be issued, then a close command is generated at a block 538. The open command or close command are transmitted to the particular remote operated device 110, as required in accordance with the schedule. If no change is required, then the routine ends.

Thus, in accordance with the invention, sunrise and sunset times are calculated based on longitude and latitude and time zone of a particular location selected from a database pre-populated with designated cities and countries.

The present invention has been described with respect to flowcharts and block diagrams. It will be understood that each block of the flowchart and block diagrams can be implemented by computer program instructions. These program instructions may be provided to a processor to produce a machine, such that the instructions which execute on the processor create means for implementing the functions specified in the blocks. The computer program instructions may be executed by a processor to cause a series of operational steps to be performed by the processor to produce a computer implemented process such that the instructions which execute on the processor provide steps for implementing the functions specified in the blocks. Accordingly, the illustrations support combinations of means for performing a specified function and combinations of steps for performing the specified functions. It will also be understood that each block and combination of blocks can be implemented by special purpose hardware-based systems which perform the specified functions or steps, or combinations of special purpose hardware and computer instructions.

We claim:

1. An electrical distribution system for selectively connecting an electrical power source to a load device using astronomical calculations, comprising:
   a switching device electrically connected between an electrical power source and a load device for selectively delivering electrical power to the load device;
   a control system for controlling operation of the switching device, the control system comprising a programmed controller for commanding operation of the switching device in accordance with a scheduling routine stored in a memory, the scheduling routine enabling control of the switching device based on sunrise and sunset time, the memory further comprising a database of a plurality of geographic locations and coordinate information for the plurality of geographic locations, the control system further comprising a setup routine comprising a user interface displaying a list of available geographic locations and enabling a user to select one of the plurality of geographic locations and a manager routine automatically operable each day to calculate sunrise and sunset times for the day using the coordinate information, comprising latitude, longitude and time zone, for the selected geographic location and providing the sunrise and sunset times to the scheduling routine.

2. The electrical distribution system of claim 1 wherein the manager routine is operated daily to determine sunrise and sunset times using the coordinate information for the selected geographic location and provide the sunrise and sunset times to the scheduling routine.

3. The electrical distribution system of claim 1 wherein the control system further comprises a touch screen display used by the user interface to select one of the plurality of geographic locations.

4. The electrical distribution system of claim 1 wherein the geographic locations comprise preselect cities.

5. The electrical distribution system of claim 1 wherein the setup routine includes a manual override enabling a user to manually enter coordinate information.

6. The electrical distribution system of claim 1 wherein the control system comprises a display displaying calculated sunrise and sunset time.

7. The electrical distribution system of claim 1 further comprising a panelboard and a plurality of switching devices mounted in the panelboard and wherein the control system controls operation of the plurality of switching devices in accordance with the scheduling routine.

8. The electrical distribution system of claim 7 wherein the panelboard supports a plurality of circuit breakers, each electrically connected in series with one of the plurality of switching devices.

9. The electrical distribution system of claim 7 wherein the switching devices are removable from the panelboard separately from the control system.

10. The electrical distribution system of claim 1 wherein the switching device comprises a control relay.

11. A lighting control system for selectively connecting an electrical power source to load devices using astronomical calculations, comprising:
   a panelboard;
   a plurality of pairs of circuit breakers and switching devices modules mounted in the panelboard, each pair electrically connected between an electrical power source and a load device for selectively delivering electrical power to load devices;
   a control system mounted in the panelboard and electrically connected to the switching devices for controlling operation of the switching devices, the control system comprising a programmed controller for commanding operation of the individual switching devices in accordance with a scheduling routine stored in a memory, the scheduling routine enabling control of the switching devices based on sunrise and sunset time, the memory further comprising a database of a plurality of geographic locations and coordinate information for the plurality of geographic locations, the control system further comprising a setup routine comprising a user interface enabling a user to select one of the plurality of geographic locations and a manager routine automatically determining sunrise and sunset times using the coordinate information for the selected geographic location and providing the sunrise and sunset times to the scheduling routine.

12. The lighting control system of claim 11 wherein the manager routine is operated daily to determine sunrise and sunset times using the coordinate information for the selected geographic location and provide the sunrise and sunset times to the scheduling routine.

13. The lighting control system of claim 11 wherein the control system further comprises a touch screen display used by the user interface to select one of the plurality of geographic locations.

14. The lighting control system of claim 11 wherein the setup routine includes a manual override enabling a user to manually enter coordinate information.

15. The lighting control system of claim 11 wherein the coordinate information comprises longitude, latitude and time zone of the geographic locations.

16. The lighting control system of claim 11 wherein the switching devices are individually removable from the panelboard separately from circuit breakers and the control system.

17. The method for selectively connecting an electrical power source to a load device using astronomical calculations, comprising:

providing a switching device electrically connected between an electrical power source and a load device for selectively delivering electrical power to the load device;

providing a programmed controller for commanding operation of the switching device in accordance with a scheduling routine stored in a memory, the scheduling routine enabling control of the switching device based on sunrise and sunset time, the programmed controller including a database of a plurality of geographic locations and coordinate information for the plurality of geographic locations;

operating a user interface of the programmed controller to display a listing of available geographic locations to enable a user to select one of the plurality of geographic locations; and automatically each day calculating sunrise and sunset times using the coordinate information for the selected geographic location and providing the sunrise and sunset times to the scheduling routine.

18. The method of claim 17 wherein the step of automatically determining sunrise and sunset times using the coordinate information for the selected geographic location and providing the sunrise and sunset times to the scheduling program is performed daily.

19. The method of claim 17 further comprising manually entering coordinate information if a desired geographic location is not stored in the database.

20. The method of claim 17 wherein the coordinate information comprises longitude, latitude and time zone of the geographic locations.

* * * * *